(12) United States Patent
Buesing

(10) Patent No.: US 10,870,484 B2
(45) Date of Patent: Dec. 22, 2020

(54) ADJUSTMENT OF TRACK AND BALANCE OF A MULTI-BLADE ROTOR

(71) Applicant: AIRBUS HELICOPTERS DEUTSCHLAND GMBH, Donauworth (DE)

(72) Inventor: Moritz Buesing, Augsburg (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 267 days.

(21) Appl. No.: 15/704,185

(22) Filed: Sep. 14, 2017

(65) Prior Publication Data
US 2018/0072412 A1 Mar. 15, 2018

(30) Foreign Application Priority Data
Sep. 15, 2016 (EP) ..................................... 16400042

(51) Int. Cl.
*B64C 27/59* (2006.01)
*B64C 27/605* (2006.01)
(Continued)

(52) U.S. Cl.
CPC .............. *B64C 27/59* (2013.01); *B64C 11/32* (2013.01); *B64C 27/008* (2013.01); *B64C 27/32* (2013.01);
(Continued)

(58) Field of Classification Search
CPC ............. B64C 11/32; B64C 2027/7216; B64C 27/008; B64C 27/32; B64C 27/59;
(Continued)

(56) References Cited

U.S. PATENT DOCUMENTS 1,854,938 A 4/1932 Jantsch
2,506,960 A 5/1950 Hensley
(Continued)

FOREIGN PATENT DOCUMENTS

CN 101130370 A 2/2008
DE 4115110 A1 11/1991
(Continued)

OTHER PUBLICATIONS

European Search Report and Written Opinion for European Application No. EP 16400042, Completed by the European Patent Office on Feb. 16, 2017, All together 6 Pages.

*Primary Examiner* — Carl C Staubach
(74) *Attorney, Agent, or Firm* — Brooks Kushman P.C.

(57) ABSTRACT

A multi-blade rotor of a rotary wing aircraft, the multi-blade rotor comprising at least one rotor blade that defines a pitch axis and that is provided with an associated pitch-control lever that is operatively coupled to a pitch link rod, the pitch link rod defining a longitudinal axis, wherein the associated pitch-control lever comprises an accommodation that is located on the longitudinal axis of the pitch link rod at a predetermined distance from the pitch axis of the at least one rotor blade, the pitch link rod being operatively coupled to the associated pitch-control lever at the accommodation of the associated pitch-control lever, wherein the predetermined distance is adjustable in order to enable adjustment of track and balance of the multi-blade rotor.

20 Claims, 7 Drawing Sheets

(51) Int. Cl.
   *B64C 27/00*   (2006.01)
   *B64C 11/32*   (2006.01)
   *B64C 27/32*   (2006.01)
   *B64C 27/72*   (2006.01)

(52) U.S. Cl.
   CPC .... *B64C 27/605* (2013.01); *B64C 2027/7216* (2013.01)

(58) Field of Classification Search
   CPC ....... B64C 27/605; B64C 11/36; B64C 11/30; F01D 7/00; F05D 2260/74; F05D 2260/76; F05D 2260/79; F05D 2260/70; F05D 2260/75
   See application file for complete search history.

(56) References Cited

U.S. PATENT DOCUMENTS

| | | | |
|---|---|---|---|
| 2,859,058 A | 11/1958 | Traugott | |
| 2,890,893 A | 6/1959 | Laukhuff | |
| 3,163,441 A | 12/1964 | Traugott | |
| 3,415,324 A | 12/1968 | Austin | |
| 3,880,444 A | 4/1975 | Bridges | |
| 4,026,578 A | 5/1977 | Mattson | |
| 4,053,123 A | 10/1977 | Chadwick | |
| 4,813,163 A | 3/1989 | Livingston et al. | |
| 4,831,744 A | 5/1989 | Specktor et al. | |
| 5,026,254 A | 6/1991 | Ford et al. | |
| 5,052,711 A | 10/1991 | Pirkey et al. | |
| 5,382,043 A | 1/1995 | Jordan | |
| 5,431,540 A * | 7/1995 | Doolin | B64C 27/59 416/168 R |
| 5,454,153 A | 10/1995 | Noel | |
| 5,511,944 A | 4/1996 | Ide et al. | |
| 5,538,273 A | 7/1996 | Osenbaugh et al. | |
| 5,580,201 A | 12/1996 | Brilmyer | |
| 5,927,665 A | 7/1999 | Grabnic | |
| 6,113,299 A * | 9/2000 | Reichelt | B60G 7/02 403/13 |
| 6,402,168 B1* | 6/2002 | Chino | B62D 17/00 280/86.754 |
| 6,688,616 B1 | 2/2004 | Ziech | |
| 7,438,492 B2 | 10/2008 | Naudet et al. | |
| 9,186,945 B2 | 11/2015 | Luttinen et al. | |
| 9,315,257 B2 | 4/2016 | Arnold et al. | |
| 2002/0079664 A1 | 6/2002 | Orimoto et al. | |
| 2003/0131682 A1 | 7/2003 | Crane et al. | |
| 2004/0165939 A1 | 8/2004 | Marche | |
| 2006/0237581 A1 | 10/2006 | Gerbino | |
| 2007/0166162 A1 | 7/2007 | Podgurski | |
| 2012/0219379 A1 | 8/2012 | Frens | |
| 2014/0178199 A1* | 6/2014 | Wiinikka | B64C 27/51 416/1 |
| 2016/0090178 A1 | 3/2016 | Paynton | |

FOREIGN PATENT DOCUMENTS

| | | |
|---|---|---|
| DE | 19934739 A1 | 2/2000 |
| DE | 10257198 A1 | 7/2003 |
| DE | 102004041042 A1 | 3/2006 |
| DE | 102012206755 A1 | 10/2013 |
| DE | 102013111114 A1 | 4/2015 |
| DE | 102015101438 A1 | 8/2015 |
| EP | 0306626 A2 | 3/1989 |
| EP | 0448653 A1 | 10/1991 |
| EP | 0985565 A1 | 3/2000 |
| EP | 1197358 A1 | 4/2002 |
| EP | 1491781 A1 | 12/2004 |
| EP | 2610168 A1 | 7/2013 |
| WO | 9706047 A1 | 2/1997 |
| WO | 0183894 A1 | 11/2001 |
| WO | 2010124326 A1 | 11/2010 |
| WO | 2013086387 A1 | 6/2013 |
| WO | 2014044914 A1 | 3/2014 |

\* cited by examiner

ADJUSTMENT OF TRACK AND BALANCE OF A MULTI-BLADE ROTOR

CROSS-REFERENCE TO RELATED APPLICATIONS

This application claims priority to European patent application No. EP 16400042.4 filed on Sep. 15, 2016, the disclosure of which is incorporated in its entirety by reference herein.

BACKGROUND OF THE INVENTION

(1) Field of the Invention

The invention is related to a multi-blade rotor of a rotor craft, the multi-blade rotor comprising at least one rotor blade that defines a pitch axis.

(2) Description of Related Art

In rotor assemblies with a predefined number of rotor blades, each rotor blade is usually controlled individually over its azimuth angle of rotation. This is generally known as cyclic and collective pitch actuation, which is implemented in current Vertical Take-Off and Landing aircrafts and which generally requires suitable pitch adjustment devices. The latter are necessary to adjust each rotor blade individually by actively rotating in operation each rotor blade around its longitudinal axis, which defines the rotor blade's pitch axis.

More specifically, rotor assemblies are actively actuated rotor assemblies that are usually not only provided with cyclic, but also with collective pitch adjustment devices in order to control the lift of the rotor blades at different azimuth angles and thereby control the lift and control forces of the rotor craft. The azimuth angle is defined with respect to a respectively advancing rotor blade as being 0° for an aft most position of the rotor blade and as being 90° on a respective advancing blade side. However, the cyclic and collective pitch adjustment devices are generally embodied as active actuation means with a comparatively great complexity and weight and require the implementation of cost-intensive, complex controlling mechanisms and surveillance means.

Usually, such cyclic and collective pitch adjustment devices imply use of suitable pitch-control levers that are respectively operatively coupled to associated pitch link rods. Each pitch link rod is operatively coupled to a given one of the suitable pitch-control levers at an accommodation provided thereon.

It is also necessary to adjust "track" and "balance" of a given rotor assembly with a predefined number of rotor blades in order to neutralize imperfections due to manufacturing tolerances, material tolerances, aging effects etc. The term "track" relates to a path along which respective blade tips of the rotor blades are travelling while rotating. This track must be within certain tolerances in order to achieve desirable loads, vibrations, noise and performance. The term "balance" in turn relates to a balancing of combined forces and moments, especially centrifugal forces, of all rotor blades of the given rotor assembly at a respective center of the rotor assembly. This means that in a balanced rotor assembly the centrifugal loads of the rotor blades neutralize each other, within allowable tolerances, and that all other dynamic rotor loads and aerodynamic rotor loads are constant, within allowable tolerances, for stationary flight conditions. Consequently, both track and balance are related to each other and depend on a respective mass, mass distribution, stiffness and stiffness distribution of each one of the rotor blades and a respective geometry of associated control linkages and geometry of underlying aerodynamic surfaces.

More generally, balanced rotor loads are achieved by adjusting the rotor blades of a given rotor assembly, so that each rotor blade creates the same sum of dynamic and aerodynamic loads at any arbitrary rotation angle relative to an associated non-rotating system during rotation of the rotor blade. Therein, the loads at different azimuth angles may be different.

The dynamic loads depend on a respective first moment of inertia and an underlying chordwise mass distribution. The first moment of inertia is adjusted for balancing the centrifugal forces, as described in more detail below. The chordwise mass distribution can be adjusted by moving or exchanging balancing masses between two balancing chambers which are at a same radius position, but different chordwise positions, i.e. one is nearer to the leading edge and the other is nearer to the trailing edge of a given rotor blade. The aerodynamic loads depend on an underlying geometry of a selected aerodynamic profile, twist, setting of trim-taps and stiffness, as well as stiffness distribution of the given rotor blade. These variables affect primarily two load aspects, i.e. an overall blade lift at a nominal control position (0°), and a change of blade lift due to a change of a respective control position.

The most important aspect of balancing is to reach a constant centrifugal force in all rotor blades of a given rotor assembly, so that respective centrifugal forces acting on all parts of the given rotor assembly neutralize each other at a center of the rotor assembly. Therefore, the first moment of inertia of the rotor blades is adjusted as explained above. This is achieved through adding or removing mass at certain positions on a given rotor blade.

More specifically, the mass and mass distribution are usually adjusted by means of balancing masses, such as e.g. chunks of lead, tungsten, steel, or plastic, which are added in respective balancing chambers provided in each one of the rotor blades. These balancing masses can be moved between different balancing chambers, or their positions can be changed within a given balancing chamber. Furthermore, material can be added or removed in certain areas of the rotor blades, e.g. by adding paint or additional composite layers, or by removing layers or material through milling or drilling, etc.

Ideally, such a balancing is not affected by other track and balance effects. However, imperfections in aerodynamic drag and lift of the given rotor assembly, as well as in the stiffness and stiffness distribution and heat-strain of the rotor blades can change the respective first moments of inertia of the rotor blades and the center of gravity of the rotor assembly during operation.

However, the stiffness and stiffness distributions of respective rotor blades of a given rotor assembly can usually not be adjusted. Only a total weight and weight distribution, as well as an underlying length of respective pitch link rods and aerodynamic trim-taps can be adjusted.

Usually, lift of a given rotor blade of the rotor assembly at the above described nominal control position is adjusted through the setting of the aerodynamic trim-taps and the length of the respective pitch link rods. More specifically, the change of lift due to change of a respective control position is related to twist and torsional stiffness of the rotor blades. Dynamic loads due to the chordwise mass distribution also create torsional loads, which can neutralize or exacerbate the aerodynamic torsional loads and the sum of both loads can change the twist of the rotor blades due to their limited torsional stiffness. The resulting twist results in a certain effective pitching angle, which changes the aerodynamic lift. Therefore, the change of the lift due to the change of the control position can be adjusted by means of the chordwise mass distribution, as described above. The trim-taps also affect the change of the lift due to the change of the control position due to their influence on the aerodynamic torsion moment, but this is also coupled with the lift at nominal control position.

However, changes of the chordwise mass distribution can be elaborate and they are usually limited by a respective accommodation capacity of provided balancing chambers. In other words, when the respective accommodation capacity is reached, other even more elaborate means for changing the mass distribution have to be considered, e.g. adding or removing structural material or paint, as described above. Furthermore, a respective dynamic torsion moment that is created by setting of the chordwise mass distribution occurs delayed, approximately at a 60° to 90° rotation angle. Therefore, if the track and balance is optimized for hover flight, it can usually not simultaneously be optimized for forward flight.

Exemplary devices and methods for adjustment means in general, but for adjustment of track and balance of rotor assemblies in particular, and more specifically by adjusting total weight and weight distribution as well as an underlying length of respective pitch link rods, are described in the documents: DE 10 2015 101 438 A1, DE 10 2013 111 114 A1, EP 2 610 168 A1, WO 2014/044914 A1, DE 10 2012 206 755 A1, WO 2013/086387 A1, US 2012/0219379 A1, WO 2010/124326 A1, CN 101 130 370 A, US 2007/0166162 A1, DE 10 2004 041 042 A1, EP 1 491 781 A1, US 2004/0165939 A1, US 2003/0131682 A1, DE 102 57 198 A1, EP 1 197 358 A1, WO 2001/83894 A1, EP 0 985 565 A1, US 2002/079664 A1, DE 199 34 739 A1, U.S. Pat. Nos. 5,927,665 A, 5,580,201 A, WO 97/06047 A1, U.S. Pat. Nos. 5,538,273 A, 5,382,043 A, 5,454,153 A, 5,511,944 A, DE 41 15 110 A1, EP 0 448 653 A1, U.S. Pat. Nos. 4,813,163 A, 4,831,744 A, EP 0 306 626 A2, U.S. Pat. Nos. 4,053,123 A, 4,026,578 A, 3,880,444 A, 3,415,324 A, 3,163,441 A, 2,859, 058 A, 2,890,893 A, 2,506,960 A and 1,854,938 A, US2016090178 and US2006237581.

The document US2014178199 describes a helicopter comprising a main rotor assembly. In the main rotor assembly, each rotor blade is configured to selectively rotate about a pitch axis. A system for fine adjustment acts on the overall effective length of a lead-lag damper. The length adjustment system comprises an eccentric bushing, generally along the main axis of the main rotor assembly. The eccentric bushing is carried by a pitch horn, connected to the rotor. The eccentric bushing comprises a bushing central axis about which the eccentric bushing is dynamically rotated and a bolt hole axis that is generally parallel to, but offset from, the bushing central axis. Thus, rotation of the eccentric bushing about the bushing central axis causes the bolt hole axis to angularly rotate about the bushing central axis.

The U.S. Pat. No. 5,431,540 describes classical means for adjustment of track and balance of rotor assemblies, by adjusting total weight and weight distribution as well as an under lying length of respective pitch link rods. In fact, a helicopter main rotor hub assembly comprises a plurality of spindle subassemblies. The spindle subassemblies include cuffs for mechanically interconnecting the main rotor blades to the main rotor hub assembly. The assembly comprises several interfacing hub elements including pitch horns disposed in combination with respective spindle subassemblies, a rotating swashplate, and a plurality of main rotor pitch control rod subassemblies. The main rotor pitch control rod subassemblies are mechanically adjustable tension/compression linkages. The subassemblies provide the mechanical interface between the rotating swashplate and the corresponding pitch arms. Each main rotor pitch control rod subassembly is mechanically adjustable in axial length to provide tracking correction for a corresponding main rotor blade. Adjusting the axial length of a main rotor pitch control rod subassembly produces a change in the pitch angle of the corresponding main rotor blade, which causes the corresponding main rotor blade tip to move back into the tip path plane of the main rotor.

BRIEF SUMMARY OF THE INVENTION

It is, therefore, an object of the present invention to provide a new rotor assembly that is embodied to allow for an easy and simple adjustment of track and balance.

This object is solved by a multi-blade rotor of a rotary wing aircraft with the features of claim 1.

More specifically, according to the invention a multi-blade rotor of a rotary wing aircraft comprises at least one rotor blade that defines a pitch axis, the at least one rotor blade being provided with an associated pitch-control lever that is operatively coupled to a pitch link rod, the pitch link rod defining a longitudinal axis. The associated pitch-control lever comprises an accommodation that is located on the longitudinal axis of the pitch link rod at a predetermined distance from the pitch axis of the at least one rotor blade, the pitch link rod being operatively coupled to the associated pitch-control lever at the accommodation of the associated pitch-control lever. The predetermined distance is adjustable in order to enable adjustment of track and balance of the multi-blade rotor.

According to one aspect, if the predetermined distance is decreased, a given displacement of the pitch link rod in operation of the multi-blade rotor causes a comparatively large change of a respectively induced pitching angle of a corresponding rotor blade. In contrast, if the predetermined distance is increased, the given displacement of the pitch link rod causes a comparatively smaller change of the respectively induced pitching angle of the corresponding rotor blade. As the respectively induced pitching angle defines lift created by the corresponding rotor blade, the created lift can, thus, be adjusted by adjusting the predetermined distance, i.e. by adjusting an underlying control position of a given pitch link rod, which is defined by its accommodation provided on the associated pitch-control lever.

Advantageously, the adjustment of the created lift due to the adjustment of the control position by means of adjusting the predetermined distance is independent from the above described adjustment of the lift at the nominal control position through the length of the pitch link rod and setting of the trim-taps, and also independent from the dynamic loads from the chordwise mass distribution. Therefore, it provides an additional degree of freedom for a required track and balance adjustment procedure.

Furthermore, a torsional moment applied through the pitch-control lever occurs immediately, so that a delay required for change of a respectively effective pitching angle only depends on an underlying torsional stiffness of a given rotor blade. The delay of the effective pitching angle obtained with the inventive multi-blade rotor is comparatively small, approximately 0° to 20° rotation angle. Moreover, an optimum for track and balance for hover flight and an optimum for track and balance for forward flight are closer together for smaller delays, so that a corresponding tradeoff obtained with the inventive multi-blade rotor is lower than for the chordwise balancing chambers. Advantageously, if the chordwise balancing chambers are used for track and balance adjustment together with adjustment of the predetermined distance, then track and balance during hover flight and forward flight of a given rotary wing aircraft can be improved simultaneously.

According to one aspect, track and balance can initially be adjusted by using the chordwise balancing chambers. Then, when the capacity of these chordwise balancing chambers is reached, an underlying adjustment range can be extended by adjusting the predetermined distance according to the present invention. In most cases the adjustment of the predetermined distance is cheaper than adding or removing structural mass to or from a given rotor blade.

According to a preferred embodiment, the associated pitch-control lever comprises a bushing accommodation, the bushing accommodation being provided with an exchangeable bushing that provides the accommodation of the associated pitch-control lever.

According to a further preferred embodiment, the exchangeable bushing is arranged in a supplementary bushing that defines the bushing accommodation, the supplementary bushing being arranged in an associated accommodation provided in the associated pitch-control lever.

According to a further preferred embodiment, the associated pitch-control lever comprises a bushing accommodation, the bushing accommodation being provided with an exchangeable bushing that comprises an at least partly serrated inner contour.

According to a further preferred embodiment, a connector with an at least partly serrated outer contour is arranged in the exchangeable bushing, the at least partly serrated outer contour matching the at least partly serrated inner contour of the exchangeable bushing, wherein the connector operatively couples the associated pitch-control lever to the pitch link rod.

According to a further preferred embodiment, an insert with an at least partly serrated outer contour is arranged in the exchangeable bushing, the at least partly serrated outer contour matching the at least partly serrated inner contour of the exchangeable bushing, wherein the insert provides the accommodation of the associated pitch-control lever.

According to a further preferred embodiment, the associated pitch-control lever comprises a bushing accommodation with a torque-transferring inner contour, the bushing accommodation being provided with an exchangeable bushing that comprises a torque-transferring outer contour, the torque-transferring outer contour matching the torque-transferring inner contour, wherein the exchangeable bushing provides the accommodation of the associated pitch-control lever, the accommodation being arranged eccentrically on the exchangeable bushing.

According to a further preferred embodiment, the associated pitch-control lever comprises a bushing accommodation, the bushing accommodation being provided with an exchangeable bushing that is at least partly arranged in the bushing accommodation and that provides the accommodation of the associated pitch-control lever, the accommodation of the associated pitch-control lever being arranged eccentrically on the exchangeable bushing.

According to a further preferred embodiment, the exchangeable bushing comprises an elongated flange that is attached to the associated pitch-control lever by means of an associated fixation member, the elongated flange comprising an associated opening for arrangement of the associated fixation member and being releasable for enabling rotation of the exchangeable bushing in the bushing accommodation.

According to a further preferred embodiment, the associated pitch-control lever comprises a plurality of openings that are adapted for receiving the associated fixation member.

According to a further preferred embodiment, the exchangeable bushing comprises an at least approximately semi-circular flange that is attached to the associated pitch-control lever by means of an associated fixation member, the at least approximately semi-circular flange comprising a plurality of openings for a selective arrangement of the associated fixation member and being releasable for enabling rotation of the exchangeable bushing in the bushing accommodation.

According to a further preferred embodiment, the associated pitch-control lever comprises a single opening for receiving the associated fixation member.

According to a further preferred embodiment, the plurality of openings is arranged on at least two separate arc-shaped arrangement patterns, wherein the associated pitch-control lever comprises a separate opening for each one of the at least two separate arc-shaped arrangement patterns, each separate opening being provided for selectively receiving the associated fixation member.

According to a further preferred embodiment, the associated pitch-control lever comprises a bushing accommodation, the bushing accommodation being provided with an exchangeable bushing that is at least partly arranged in the bushing accommodation and that comprises an at least approximately L-shaped flange, the accommodation of the associated pitch-control lever being arranged on the at least approximately L-shaped flange that is attached to the associated pitch-control lever by means of an associated fixation member.

According to a further preferred embodiment, the accommodation of the associated pitch-control lever is relocated by filling the accommodation with an associated filling material and recreating the accommodation at a distinct predetermined location on the associated pitch-control lever.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
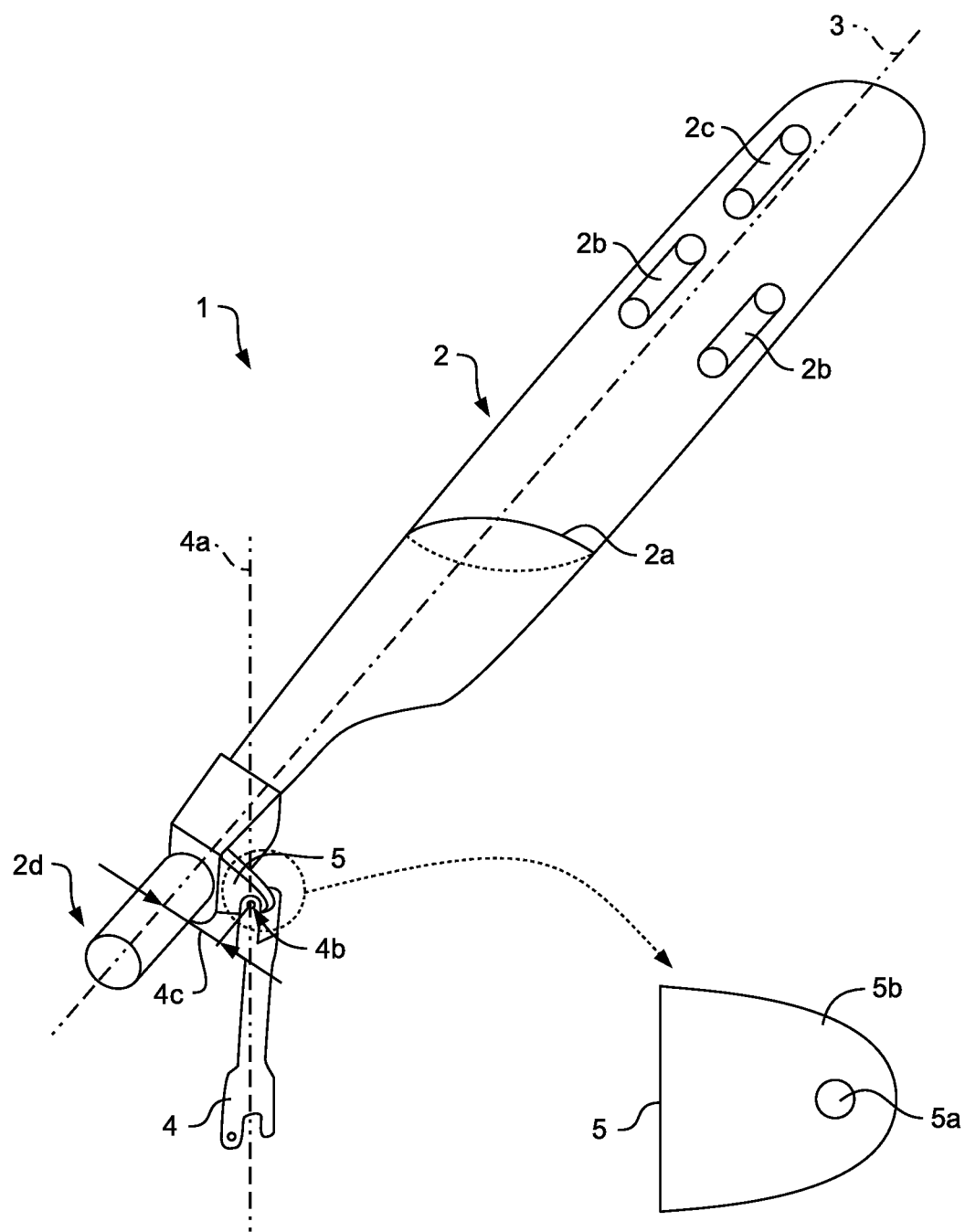
FIG. 1 shows a perspective view of a multi-blade rotor having a rotor blade with a pitch-control lever according to the invention.

FIG. 1 shows a multi-blade rotor 1 of a rotary wing aircraft, in particular a multi-blade rotor for a main rotor of a helicopter, which is preferably embodied as a fully articulated rotor, hingeless rotor, or bearingless rotor. The multi-blade rotor 1 preferably comprises a multiplicity of rotor blades. However, for simplicity and clarity of the drawings, only a single rotor blade is illustrated and labelled with the reference sign 2.

The rotor blade 2 is illustratively defined by an underlying airfoil 2a and is provided with at least one and preferably two or more chordwise balancing chambers 2b, as well as one or more radial balancing chambers 2c. Furthermore, the rotor blade 2 is provided with an associated blade grip 2d, by means of which the rotor blade 2 is connected in a rotatable manner to an associated rotor head, which is, however, not illustrated in detail for simplicity and clarity of the drawings.

According to one aspect, at least one of the multiplicity of rotor blades, and by way of example the rotor blade 2, defines a pitch axis 3 and is provided with an associated pitch-control lever 5 that is operatively coupled to a pitch link rod 4. Illustratively, the pitch link rod 4 defines a longitudinal axis 4a and the pitch-control lever 5 comprises an accommodation 5a that is located on the longitudinal axis 4a of the pitch link rod 4. The pitch-control lever further comprises a so-called pitch horn 5b, wherein the accommodation 5a is provided. The pitch-control lever 5 with the pitch horn 5b and the accommodation 5a is further illustrated in an enlarged detail view of FIG. 1.

Preferably, the pitch link rod 4 is operatively coupled to the pitch-control lever 5 at the accommodation 5a of the pitch-control lever 5, preferentially in a rotatable manner by means of a suitable bearing 4b. In other words, the accommodation 5a is preferably embodied to accommodate the bearing 4b. Thus, a translational movement of the pitch link rod 4 along its longitudinal axis 4a causes a rotation of the pitch-control lever 5 and, thus, the rotor blade 2 around the pitch axis 3 for controlling pitch, i.e. cyclic or collective pitch, of the rotor blade 2 in operation.

According to one aspect, the longitudinal axis 4a of the pitch link rod 4 and, more specifically, the accommodation 5a that is located on the longitudinal axis 4a, is located at a predetermined distance 4c from the pitch axis 3 of the rotor blade 2. The predetermined distance 4c is preferably adjustable in order to enable adjustment of track and balance of the multi-blade rotor 1. In other words, the predetermined distance 4c can preferentially be shortened or lengthened compared to an initial predetermined distance that is exemplified in FIG. 1.

Figure 2:
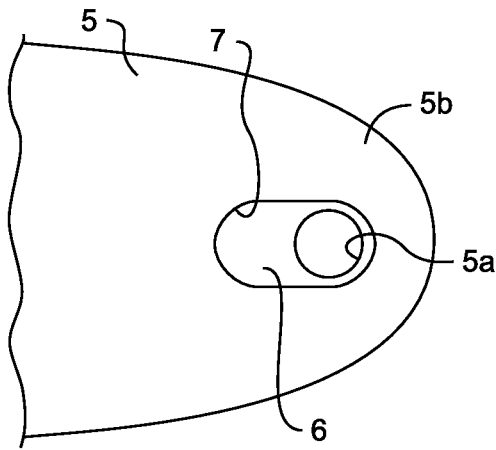
FIG. 2 shows the pitch-control lever of FIG. 1 with a bushing accommodation according to one aspect.

FIG. 2 shows the pitch-control lever 5 of FIG. 1 with the pitch horn 5b and the accommodation 5a. According to one aspect, the pitch horn 5b is provided with an elongated opening and, more specifically, with an elongated through-hole that defines a bushing accommodation 7, which is illustratively oval.

Preferably, the bushing accommodation 7 is equipped with a bushing 6 that preferentially provides the accommodation 5a of the pitch-control lever 5. The bushing 6 is preferentially exchangeable in order to allow provision of a plurality of such bushings, each having the accommodation 5a at a different location. Therefore, the bushing 6 is also referred to hereinafter as the "exchangeable bushing 6".

Figure 3:
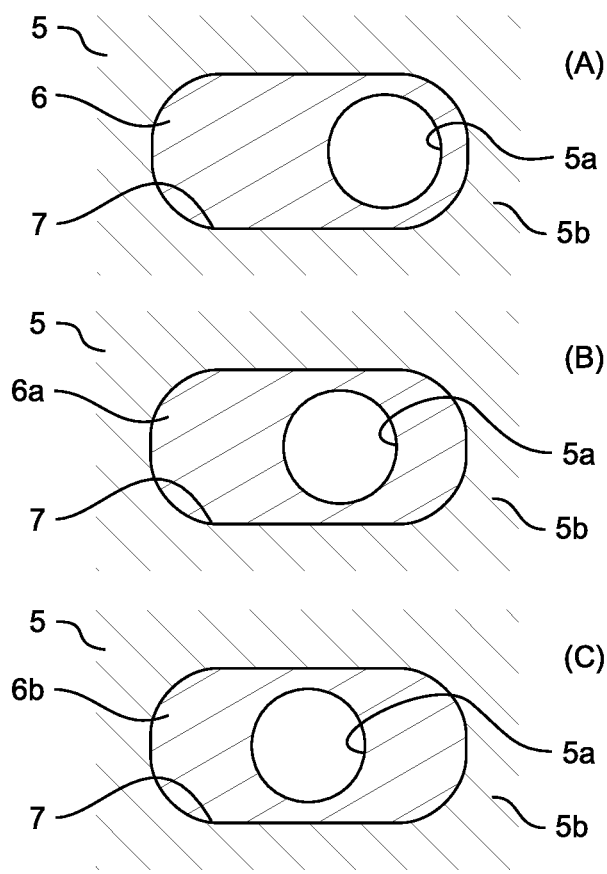
FIG. 3 shows the pitch-control lever of FIG. 2 with exchangeable bushings according to one aspect.

FIG. 3 shows the pitch-control lever 5 of FIG. 2 with the bushing accommodation 7 and three exemplary exchangeable bushings 6, 6a, 6b for use therewith. The exchangeable bushings 6, 6a, 6b are illustrated in parts (A), (B) and (C) of FIG. 3, respectively, and according to one aspect the accommodation 5a of FIG. 2 is provided at a different position in each one of the exchangeable bushings 6, 6a, 6b. Thus, the predetermined distance 4c of FIG. 1 can be adjusted as required.

More specifically, part (A) shows the exchangeable bushing 6, wherein the accommodation 5a is illustratively implemented at a rightmost position. Part (B) shows the exchangeable bushing 6a that can be used instead of the exchangeable bushing 6 of part (A), wherein the accommodation 5a is implemented at an intermediate right position that is illustratively arranged between the rightmost position according to part (A) and a central position. Part (C) shows the exchangeable bushing 6b, wherein the accommodation 5a is illustratively implemented at the central position.

Figure 4:
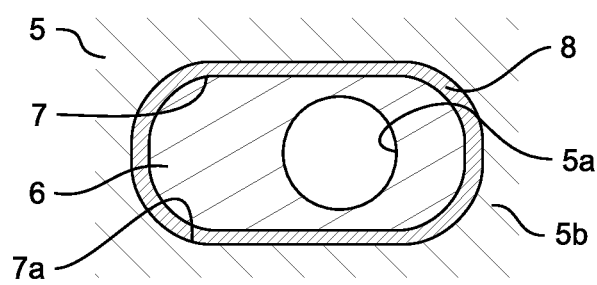
FIG. 4 shows the pitch-control lever of FIG. 2 with a supplementary bushing according to one aspect.

FIG. 4 shows the pitch-control lever 5 of FIG. 2 with the exchangeable bushing 6 that provides the accommodation 5a of FIG. 2. According to one aspect, the exchangeable bushing 6 is now arranged in a supplementary bushing 8 that defines the bushing accommodation 7 according to FIG. 2. The supplementary bushing 8 itself is preferably arranged in an elongated opening and, more specifically, in an elongated through-hole provided in the pitch-control lever 5, wherein the elongated through-hole defines an associated accommodation 7a for the supplementary bushing 8.

Figure 5:
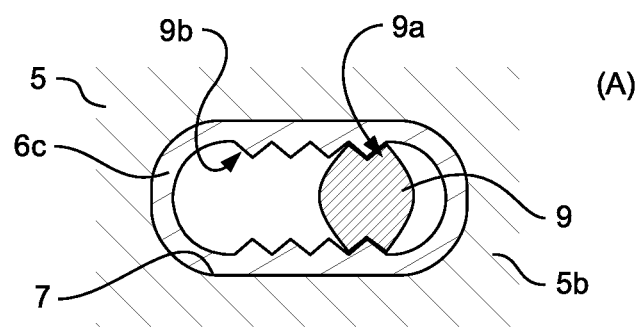
FIG. 5 shows the pitch-control lever of FIG. 1 with exchangeable bushings having partly serrated inner contours according to one aspect.
Figure 5:
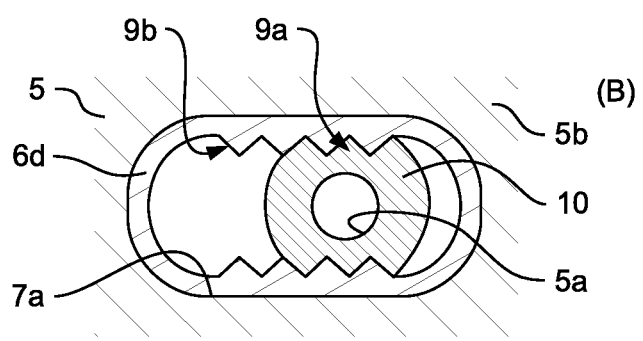

FIG. 5 shows the pitch-control lever 5 of FIG. 2 with the bushing accommodation 7 of FIG. 2, illustrated in part (A), and with the accommodation 7a of FIG. 4, illustrated in part (B). Each one of the accommodations 7, 7a is provided with an exchangeable bushing 6c, 6d, respectively, that preferably comprises an at least partly serrated or toothed inner contour 9b.

More specifically, part (A) shows the exchangeable bushing 6c that comprises the at least partly serrated inner contour 9b, wherein preferably a connector 9 with an at least partly serrated or toothed outer contour 9a is arranged. According to one aspect, the at least partly serrated outer contour 9a matches the at least partly serrated inner contour 9b and the connector 9 preferably operatively couples the pitch-control lever 5 to the pitch link rod 4 of FIG. 1. Preferably, the coupling is direct, i.e. without any other intermediate component, such as a bearing etc., so that omission of the accommodation 5a of FIG. 2 is enabled.

Part (B) shows the exchangeable bushing 6d that comprises the at least partly serrated inner contour 9b, wherein preferably an insert 10 is arranged. The insert 10 exemplarily comprises the at least partly serrated outer contour 9a that matches the at least partly serrated inner contour 9b of the exchangeable bushing 6d. Preferably, the insert 10 provides the accommodation 5a of FIG. 2.

According to one aspect, the matching of the at least partly serrated inner and outer contours 9b, 9a between the exchangeable bushings 6c, 6d and the connector 9 respectively the insert 10 allows arrangement of the connector 9 and the insert 10 within the corresponding exchangeable bushing 6c, 6d, respectively, at an arbitrarily selected position. Thus, the predetermined distance 4c of FIG. 1 can be adjusted as required.

It should be noted that the term "serrated" should not be construed as limiting the inner and outer contours 9b, 9a to specific geometric structures. Instead, any geometric structures that are suitable to provide a form fit, i.e. a positive locking between the exchangeable bushings 6c, 6d and the connector 9 respectively the insert 10 are likewise contemplated and, consequently, considered as being part of the present invention.

Figure 6:
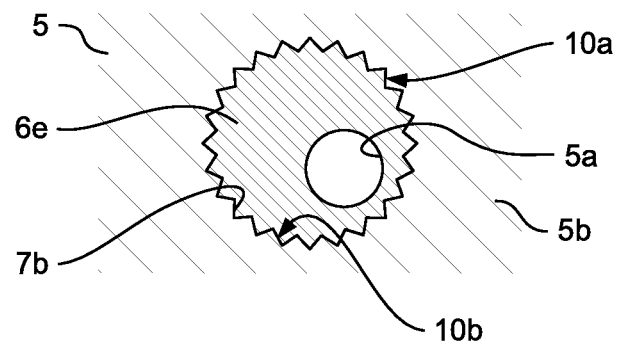
FIG. 6 shows the pitch-control lever of FIG. 1 with an insert having a serrated outer contour according to one aspect.

FIG. 6 shows the pitch-control lever 5 of FIG. 1 with the pitch horn 5b and the accommodation 5a. According to one aspect, the pitch horn 5b comprises a bushing accommodation 7b with a torque-transferring inner contour 10b. The bushing accommodation 7b is preferably provided with an exchangeable bushing 6e that comprises a torque-transferring outer contour 10a that preferentially matches the torque-transferring inner contour 10b. More specifically, the torque-transferring outer contour 10a preferably matches the torque-transferring inner contour 10b at least such that a form fit, i.e. a positive locking between the exchangeable bushing 6e and the bushing accommodation 7b is realizable.

It should be noted that the torque-transferring outer contour 10a and the torque-transferring inner contour 10b are not restricted to particular geometric structures. Instead, any geometric structures that are suitable to provide a form fit, i.e. a positive locking between the exchangeable bushing 6e and the bushing accommodation 7b are contemplated and, consequently, considered as being part of the present invention.

According to one aspect, the exchangeable bushing 6e provides the accommodation 5a. Preferably, the accommodation 5a is arranged eccentrically on the exchangeable bushing 6e. Thus, by rotating the exchangeable bushing 6e in the bushing accommodation 7b, the accommodation 5a can be located at different positions, thereby adjusting the predetermined distance 4c of FIG. 1 as required.

Figure 7:
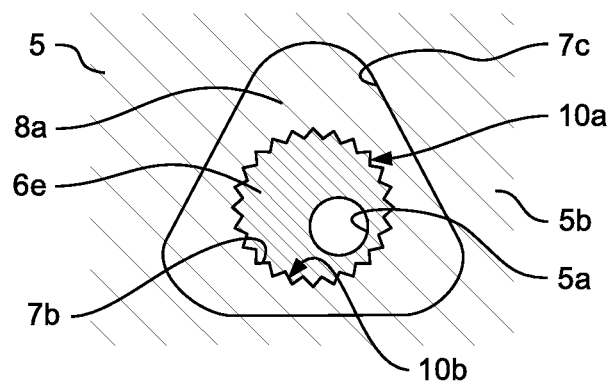
FIG. 7 shows the pitch-control lever of FIG. 6 with a supplementary bushing according to one aspect.

FIG. 7 shows the pitch-control lever 5 of FIG. 6 with the pitch horn 5b and the accommodation 5a, which is provided in the exchangeable bushing 6e of FIG. 6 that comprises the torque-transferring outer contour 10a. According to one aspect, the exchangeable bushing 6e is now arranged in a supplementary bushing 8a that comprises the bushing accommodation 7b of FIG. 6 with the torque-transferring inner contour 10b.

Preferably, the pitch horn 5b comprises a bushing accommodation 7c, wherein the supplementary bushing 8a is arranged. By way of example, the bushing accommodation 7c and the supplementary bushing 8a are provided with matching triangular shapes. However, it should be noted that these matching shapes are not restricted to a particular geometric structure. Instead, any geometric structure that is suitable to provide a form fit, i.e. a positive locking between the supplementary bushing 8a and the bushing accommodation 7c is contemplated and, consequently, considered as being part of the present invention.

Figure 8:
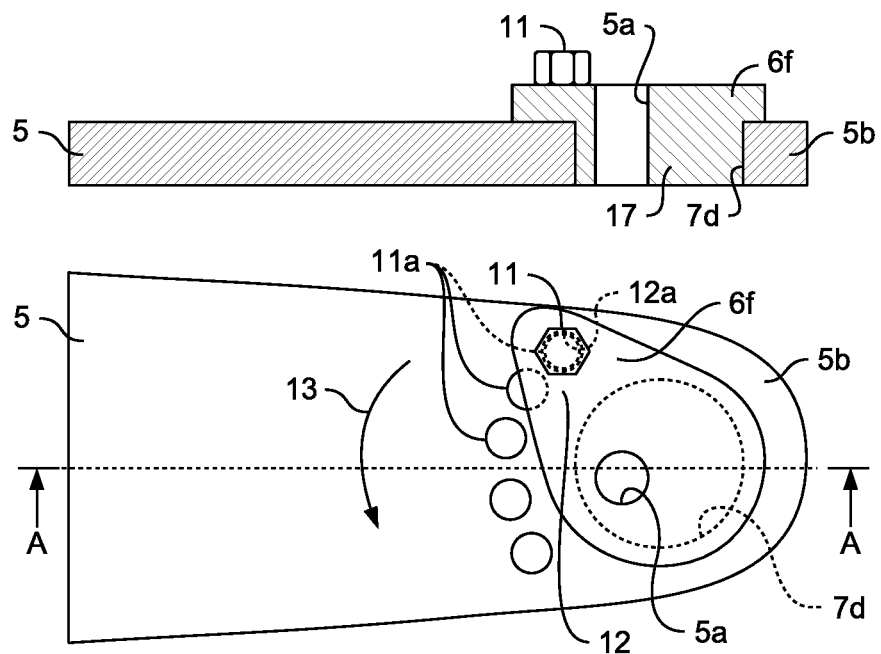
FIG. 8 shows the pitch-control lever of FIG. 1 with an exchangeable bushing having an elongated flange according to one aspect.

FIG. 8 shows the pitch-control lever 5 of FIG. 1 with the pitch horn 5b and the accommodation 5a. According to one aspect, the pitch horn 5b is provided with a circular opening and, more specifically, with a circular through-hole that defines a bushing accommodation 7d. Preferably, the bushing accommodation 7d is equipped with an exchangeable bushing 6f that is at least partly arranged in the bushing accommodation 7d and that provides the accommodation 5a. More specifically, the exchangeable bushing 6f preferentially comprises a cylindrical shaft portion 17 that is accommodated in a rotatable manner in the bushing accommodation 7d.

Preferably, the accommodation 5a is arranged eccentrically on the exchangeable bushing 6f. Thus, by rotating the exchangeable bushing 6f in the bushing accommodation 7d, the accommodation 5a can be located at different positions, thereby adjusting the predetermined distance 4c of FIG. 1 as required.

According to one aspect, the exchangeable bushing 6f comprises an elongated flange 12. The latter is arranged on a planar surface of the pitch-control lever 5. Preferably, the elongated flange 12 is attached to the pitch-control lever 5 by means of an associated fixation member 11, such as e.g. a screw, bolt or rivet. The attachment is preferentially releasable for enabling rotation of the exchangeable bushing 6f in the bushing accommodation 7d.

Preferably, the elongated flange 12 comprises an associated opening 12a, such as a through-hole, for arrangement of the fixation member 11. Furthermore, the pitch-control lever 5 preferably comprises a plurality of openings 11a, e.g. through-holes, which are adapted for receiving the fixation member 11 and which are illustratively arranged on the pitch-control lever 5 such that they define a pattern in the form of a segment of a circle. However, it should be noted that for simplicity and clarity of the drawings only three openings 11a are labelled.

According to one aspect, the opening 12a of the elongated flange 12 can be arranged coaxially with each one of the plurality of openings 11a of the pitch-control lever 5 by rotating the exchangeable bushing 6f in a rotation direction 13 in the bushing accommodation 7d. Thus, the exchangeable bushing 6f can be arranged in a plurality of rotational positions that are predefined by the plurality of openings 11a of the pitch-control lever 5.

Figure 9:
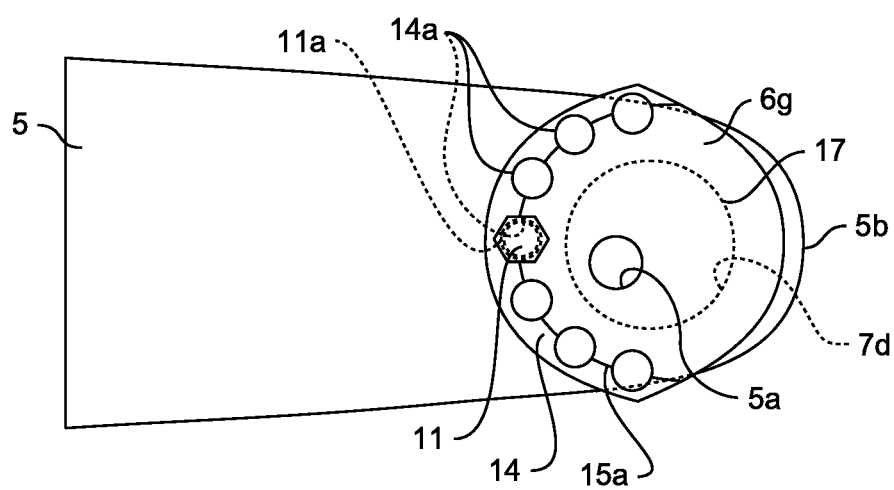
FIG. 9 shows the pitch-control lever of FIG. 1 with an exchangeable bushing having a semi-circular flange according to one aspect.

FIG. 9 shows the pitch-control lever 5 of FIG. 1 with the pitch horn 5b and the accommodation 5a. The pitch horn 5b is illustratively provided with the bushing accommodation 7d of FIG. 8. The bushing accommodation 7d is preferably equipped with an exchangeable bushing 6g that is at least partly arranged in the bushing accommodation 7d and that provides the accommodation 5a. Illustratively, the exchangeable bushing 6g comprises the cylindrical shaft portion 17 of FIG. 8 that is accommodated in a rotatable manner in the bushing accommodation 7d.

Preferably, the accommodation 5a is arranged eccentrically on the exchangeable bushing 6g. Thus, by rotating the exchangeable bushing 6g in the bushing accommodation 7d, the accommodation 5a can be located at different positions, thereby adjusting the predetermined distance 4c of FIG. 1 as required.

According to one aspect, the exchangeable bushing 6g comprises an at least approximately semi-circular flange 14. The latter is arranged on a planar surface of the pitch-control lever 5. Preferably, the at least approximately semi-circular flange 14 is attached to the pitch-control lever 5 by means of the associated fixation member 11 of FIG. 8. The attachment is preferentially releasable for enabling rotation of the exchangeable bushing 6g in the bushing accommodation 7d.

Preferably, the at least approximately semi-circular flange 14 comprises a plurality of openings 14a, such as through-holes, for a selective arrangement of the fixation member 11. By way of example, the plurality of openings 14a is arranged on the pitch-control lever 5 such that they define a pattern in the form of a segment of a circle, i.e. an arc-shaped pattern 15a. Furthermore, the pitch-control lever 5 preferably comprises a single opening 11a, e.g. a through-hole, which is adapted for receiving the fixation member 11.

According to one aspect, each one of the plurality of openings 14a of the at least approximately semi-circular flange 14 can be arranged coaxially with the single opening 11a of the pitch-control lever 5 by rotating the exchangeable bushing 6g in the bushing accommodation 7d. Thus, the exchangeable bushing 6g can be arranged in a plurality of rotational positions that are predefined by the plurality of openings 14a of the at least approximately semi-circular flange 14.

Figure 10:
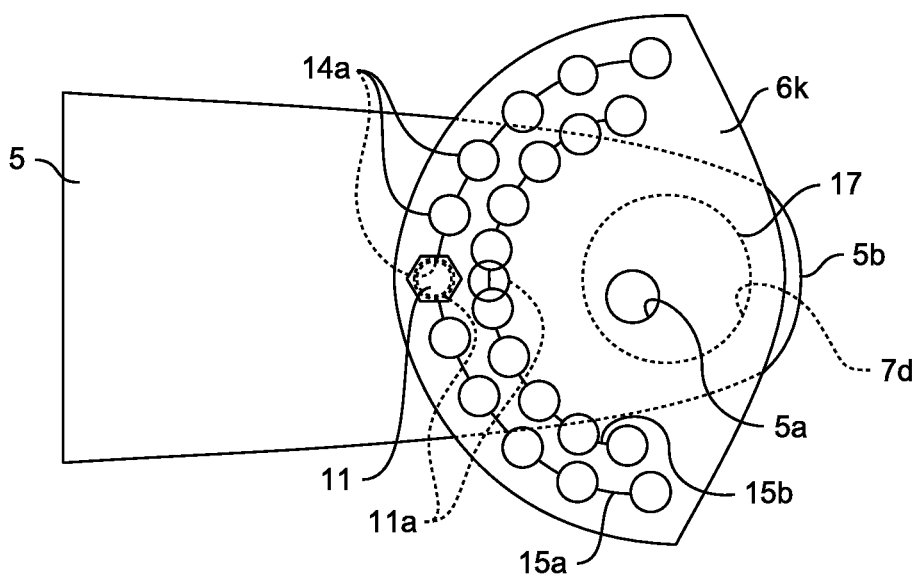
FIG. 10 shows the pitch-control lever of FIG. 1 with an exchangeable bushing having a semi-circular flange with two separate arc-shaped arrangement patterns according to one aspect.

FIG. 10 shows the pitch-control lever 5 of FIG. 1 with the pitch horn 5b and the accommodation 5a. The pitch horn 5b is illustratively provided with the bushing accommodation 7d of FIG. 8. The bushing accommodation 7d is preferably equipped with an exchangeable bushing 6h that is at least partly arranged in the bushing accommodation 7d and that provides the accommodation 5a. Illustratively, the exchangeable bushing 6h comprises the cylindrical shaft portion 17 of FIG. 8 that is accommodated in a rotatable manner in the bushing accommodation 7d.

Preferably, the accommodation 5a is arranged eccentrically on the exchangeable bushing 6h. Thus, by rotating the exchangeable bushing 6h in the bushing accommodation 7d, the accommodation 5a can be located at different positions, thereby adjusting the predetermined distance 4c of FIG. 1 as required.

According to one aspect, the exchangeable bushing 6h comprises the at least approximately semi-circular flange 14 of FIG. 9, which is arranged on a planar surface of the pitch-control lever 5. Preferably, the at least approximately semi-circular flange 14 is attached to the pitch-control lever 5 by means of the associated fixation member 11 of FIG. 8. The attachment is preferentially releasable for enabling rotation of the exchangeable bushing 6h in the bushing accommodation 7d.

Preferably, the at least approximately semi-circular flange 14 comprises a plurality of openings 14a, such as through-holes, for a selective arrangement of the fixation member 11. By way of example, the plurality of openings 14a are arranged on the pitch-control lever 5 such that they exemplarily define two separate patterns in the form of segments of a circle, i.e. two separate arc-shaped patterns 15a, 15b, which are preferentially arranged in parallel. Furthermore, the pitch-control lever 5 preferably comprises two openings 11a, i.e. a separate opening 11a for each one of the two separate arc-shaped patterns 15a, 15b. Each separate opening 11a is preferably provided for selectively receiving the fixation member 11 and, e.g., embodied as a through-hole.

According to one aspect, each one of the plurality of openings 14a of the at least approximately semi-circular flange 14 can be arranged coaxially with one of the two openings 11a of the pitch-control lever 5 by rotating the exchangeable bushing 6h in the bushing accommodation 7d. Thus, the exchangeable bushing 6h can be arranged in a plurality of rotational positions that are predefined by the plurality of openings 14a of the at least approximately semi-circular flange 14.

It should be noted that the arrangement of FIG. 10 advantageously allows for a more fine-grained adjustment of the predetermined distance 4c of FIG. 1 compared to the arrangements of FIG. 8 and FIG. 9. This more fine-grained adjustment is enabled by the comparatively great number of openings 14a that are arranged on the two separate arc-shaped patterns 15a, 15b, and that collaborate with the two openings 11a. Consequently, if a still more fine-grained adjustment is required, more than the two separate arc-shaped patterns 15a, 15b can be provided.

Figure 11:
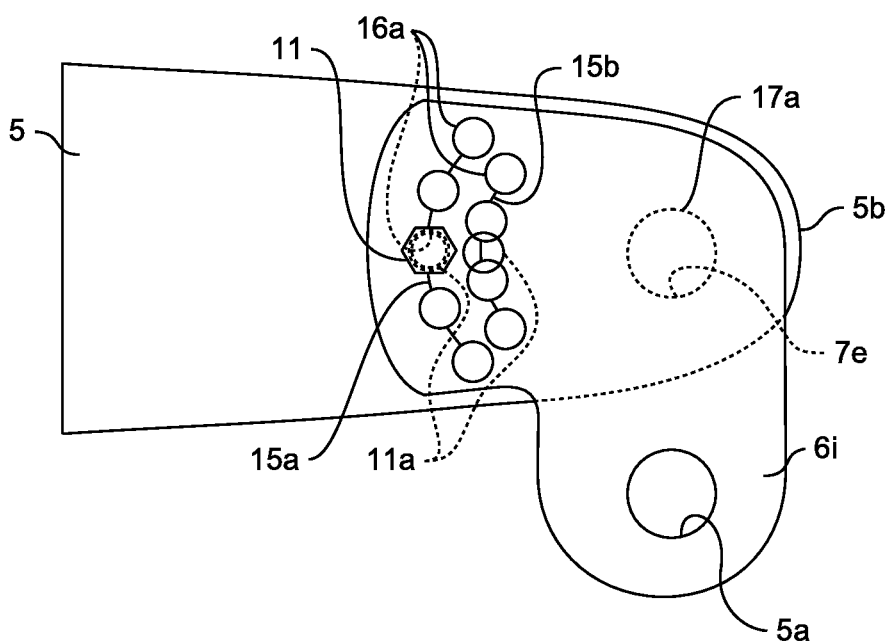
FIG. 11 shows the pitch-control lever of FIG. 1 with an exchangeable bushing having an L-shaped flange according to one aspect.

FIG. 11 shows the pitch-control lever 5 of FIG. 1 with the pitch horn 5b and the accommodation 5a. The pitch horn 5b is illustratively provided with a bushing accommodation 7e, that can be implemented by, i.e. correspond to, the accommodation 5a of FIG. 1. The bushing accommodation 7e is preferably equipped with an exchangeable bushing 6i that is at least partly arranged in the bushing accommodation 7e and that provides the accommodation 5a. Illustratively, the exchangeable bushing 6i comprises a cylindrical shaft portion 17a that is accommodated in a rotatable manner in the bushing accommodation 7e.

According to one aspect, the exchangeable bushing 6i comprises an at least approximately L-shaped flange 16, which is arranged on a planar surface of the pitch-control lever 5. Preferably, the at least approximately L-shaped flange 16 is attached to the pitch-control lever 5 by means of the associated fixation member 11 of FIG. 8. The attachment is preferentially releasable for enabling rotation of the exchangeable bushing 6i in the bushing accommodation 7e.

Preferably, the at least approximately L-shaped flange 16 comprises a plurality of openings 16a, such as through-holes, for a selective arrangement of the fixation member 11. By way of example, the plurality of openings 16a are arranged on the pitch-control lever such that they exemplarily define the two separate arc-shaped patterns 15a, 15b of FIG. 10. Furthermore, the pitch-control lever 5 preferably comprises the two openings 11a of FIG. 10.

According to one aspect, each one of the plurality of openings 16a of the at least approximately L-shaped flange 16 can be arranged coaxially with one of the two openings 11a of the pitch-control lever 5 by rotating the exchangeable bushing 6i in the bushing accommodation 7e. Thus, the exchangeable bushing 6i can be arranged in a plurality of rotational positions that are predefined by the plurality of openings 16a of the at least approximately L-shaped flange 16.

Illustratively, the plurality of openings 16a are arranged in one end region of the at least approximately L-shaped flange 16 and the accommodation 5a is arranged eccentrically in the other end region of the at least approximately L-shaped flange 16 of the exchangeable bushing 6i. Thus, by rotating the exchangeable bushing 6i in the bushing accommodation 7e, the accommodation 5a can be located at different positions, thereby adjusting the predetermined distance 4c of FIG. 1 as required.

Figure 12:
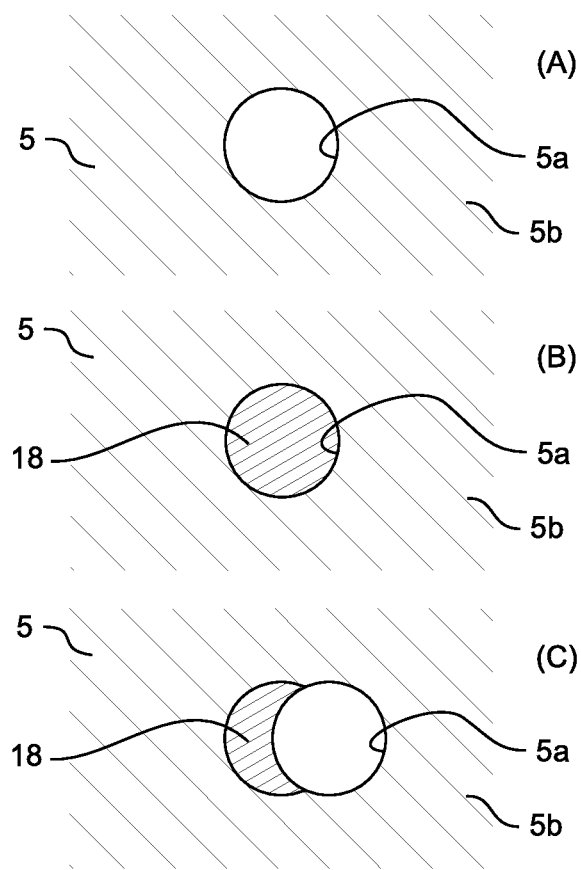
FIG. 12 shows the pitch-control lever of FIG. 1 with a relocated accommodation according to one aspect.

FIG. 12 shows the pitch-control lever 5 of FIG. 1 with the pitch horn 5b and the accommodation 5a. According to one aspect, the accommodation 5a of the pitch-control lever 5 is relocated, as illustrated in parts (A) to (C) of FIG. 12.

More specifically, part (A) shows the pitch-control lever 5 of FIG. 1 with the pitch horn 5b and the accommodation 5a at an initial location. According to part (B), the accommodation 5a at the initial location is removed, i.e. closed, by filling the accommodation 5a at the initial location with an associated filling material 18. For instance, the accommodation 5a at the initial location can be filled with resin that is cured in the accommodation 5a, or with molten material that solidifies within the accommodation 5a, or with short fiber reinforced resin that is cured in the accommodation 5a, or with a plug that is attached by means of an adhesive, solder or a weld. According to part (C), the accommodation 5a is then recreated at a distinct predetermined location on the associated pitch-control lever 5, e.g. by means of drilling.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention. For instance, the bushing accommodation 7 of FIG. 2, FIG. 3 and FIG. 5 (A), which is illustratively oval, may likewise be implemented by means of any other geometrical shape, e.g. a polygonal shape, splicing or other non-circular shape that prevents rotation of the exchangeable bushing in the bushing accommodation by transferring torque. Furthermore, the geometrical shape can be circular. However, in this case the exchangeable bushing is preferably fixed in an associated bushing accommodation, e.g. by means of a bolt, in order to prevent rotation. Moreover, instead of providing the respective bushing accommodations described above with reference to FIG. 1 to FIG. 12, a pin, bolt, rivet or a trunnion may be used for the attachment of the bearing 4b of FIG. 1. Still alternatively, the pitch-control lever described above with reference to FIG. 1 to FIG. 12 can be provided as a detachable unit, that is e.g. mounted by means of a flange to the blade grip 2d of FIG. 1. In this case, different spacers with different thicknesses, which are inserted between the detachable pitch-control lever and the blade grip 2d of FIG. 1, can be used to adjust the predetermined distance 4c of FIG. 1.

REFERENCE LIST 1 multi-blade rotor
2 rotor blade
2a airfoil
2b chordwise balancing chambers
2c radial balancing chamber
2d blade grip
3 rotor blade pitch axis
4 pitch link rod
4a pitch link rod longitudinal axis
4b pitch link rod bearing
4c pitch axis to longitudinal axis distance
5 pitch-control lever
5a bearing accommodation
5b pitch horn
6, 6a, 6b, 6c, 6d, 6e, 6f, 6g, 6h, 6i exchangeable bushings
7, 7a, 7b, 7c, 7d, 7e bushing accommodations
8, 8a supplementary bushings
9 pitch link rod connector
9a serrated outer contour
9b serrated inner contour
10 insert
10a torque-transferring outer contour
10b torque-transferring inner contour
11 fixation member
11a fixation openings
12 elongated flange
12a flange opening
13 rotation direction
14 semi-circular flange
14a flange openings
15a outer circular arc
15b inner circular arc
16 L-shaped flange
16a L-shaped flange openings
17, 17a shaft portion
18 filling material

What is claimed is:

1. A multi-blade rotor of a rotary wing aircraft, the multi-blade rotor comprising at least one rotor blade that defines a pitch axis, the at least one rotor blade being provided with an associated pitch-control lever that is operatively coupled to a pitch link rod, the pitch link rod defining a longitudinal axis, wherein the associated pitch-control lever comprises an accommodation that is located on the longitudinal axis of the pitch link rod at a predetermined distance from the pitch axis of the at least one rotor blade, the pitch link rod being operatively coupled to the associated pitch-control lever at the accommodation of the associated pitch-control lever,
wherein the associated pitch-control lever has a pitch horn that forms and defines a bushing accommodation that extends through the pitch horn, the bushing accommodation being provided with an exchangeable bushing that provides the accommodation of the associated pitch-control lever so that the predetermined distance is adjustable in order to adjust the pitching angle of the corresponding blade and thereby adjust of track and balance of the multi-blade rotor independent from an adjustment of a length of the pitch link rod.

2. The multi-blade rotor of claim 1,
wherein the exchangeable bushing is arranged in a supplementary bushing that defines the bushing accommodation, the supplementary bushing being arranged in an associated accommodation provided in the associated pitch-control lever.

3. The multi-blade rotor of claim 1,
wherein the exchangeable bushing comprises an at least partly serrated inner contour.

4. The multi-blade rotor of claim 3,
wherein a connector with an at least partly serrated outer contour is arranged in the exchangeable bushing, the at least partly serrated outer contour matching the at least partly serrated inner contour of the exchangeable bushing, wherein the connector operatively couples the associated pitch-control lever to the pitch link rod.

5. The multi-blade rotor of claim 3,
wherein an insert with an at least partly serrated outer contour is arranged in the exchangeable bushing, the at least partly serrated outer contour matching the at least partly serrated inner contour of the exchangeable bushing, wherein the insert provides the accommodation of the associated pitch-control lever.

6. The multi-blade rotor of claim 1,
wherein the bushing accommodation is provided with a torque-transferring inner contour, and wherein the exchangeable bushing comprises a torque-transferring outer contour, the torque-transferring outer contour matching the torque-transferring inner contour, wherein the exchangeable bushing provides the accommodation of the associated pitch-control lever, the accommodation being arranged eccentrically on the exchangeable bushing.

7. The multi-blade rotor of claim 1,
wherein the bushing accommodation is provided with the exchangeable bushing that is at least partly arranged in the bushing accommodation and that provides the accommodation of the associated pitch-control lever, the accommodation of the associated pitch-control lever being arranged eccentrically on the exchangeable bushing.

8. The multi-blade rotor of claim 7,
wherein the exchangeable bushing comprises an elongated flange that is attached to the associated pitch-control lever by means of an associated fixation member, the elongated flange comprising an associated opening for arrangement of the associated fixation member and being releasable for enabling rotation of the exchangeable bushing in the bushing accommodation.

9. The multi-blade rotor of claim 8,
wherein the associated pitch-control lever comprises a plurality of openings that are adapted for receiving the associated fixation member.

10. The multi-blade rotor of claim 7,
wherein the exchangeable bushing comprises a semi-circular flange that is attached to the associated pitch-control lever by means of an associated fixation member, the semi-circular flange comprising a plurality of openings for a selective arrangement of the associated fixation member and being releasable for enabling rotation of the exchangeable bushing in the bushing accommodation.

11. The multi-blade rotor according to claim 10,
wherein the associated pitch-control lever comprises a single opening for receiving the associated fixation member.

12. The multi-blade rotor of claim 10,
wherein the plurality of openings is arranged on at least two separate arc-shaped arrangement patterns, wherein the associated pitch-control lever comprises a separate opening for each one of the at least two separate arc-shaped arrangement patterns, each separate opening being provided for selectively receiving the associated fixation member.

13. The multi-blade rotor of claim 1,
wherein the bushing accommodation is provided with the exchangeable bushing that is at least partly arranged in the bushing accommodation and that comprises an L-shaped flange, the accommodation of the associated pitch-control lever being arranged on the L-shaped flange that is attached to the associated pitch-control lever by means of an associated fixation member.

14. The multi-blade rotor of claim 1,
wherein the accommodation of the associated pitch-control lever is relocated by filling the accommodation with an associated filling material and recreating the accommodation at a distinct predetermined location on the associated pitch-control lever.

15. A multi-blade rotor of a rotary wing aircraft, the multi-blade rotor comprising:
a rotor blade that defines a pitch axis, the rotor blade having a pitch-control lever, the pitch-control lever with a pitch horn, the pitch horn forming and defining a bushing accommodation aperture that extends through the pitch horn;
an exchangeable bushing received within the bushing accommodation aperture such that an outer wall of the exchangeable bushing mates with an inner wall of the bushing accommodation aperture, the exchangeable bushing defining a bearing accommodation aperture therethrough;
a pitch link rod defining a longitudinal axis, the pitch link rod extending through the bearing accommodation aperture such that the pitch link rod is rotatably coupled to the pitch-control lever via the bearing accommodation aperture;
wherein the bearing accommodation aperture is located along the longitudinal axis of the pitch link rod such that the longitudinal axis intersects both the inner wall of the bushing accommodation aperture and an inner wall of the bearing accommodation aperture, and wherein the bearing accommodation aperture is located at a predetermined distance from the pitch axis of the rotor blade; and
wherein a pitching angle of the rotor blade is adjusted via setting the predetermined distance of the bearing accommodation aperture to thereby adjust a track and balance of the rotor blade independent from an adjustment of a length of the pitch link rod.

16. The multi-blade rotor of claim 15 wherein the bushing accommodation aperture is elongated; and
wherein the exchangeable bushing has an elongated outer contour sized to be received within the elongated bushing accommodation aperture.

17. The multi-blade rotor of claim 15 wherein the bearing accommodation aperture of the exchangeable bushing is elongated and is defined by a serrated inner contour; and
wherein the pitch link rod is connected to the pitch-control lever via a pitch link rod having a serrated outer contour, the serrated outer contour sized to mate with the serrated inner contour of the exchangeable bushing to locate the pitch link rod and set the predetermined distance.

18. The multi-blade rotor of claim 15 wherein the bushing accommodation aperture has a circular cross-section;
wherein the exchangeable bushing has a shaft portion sized to be received with the bushing accommodation aperture for rotation therein, and a flange extending outwardly from the shaft portion;
wherein one of the pitch-control lever and the flange defines a fixation opening therethrough;
wherein the other of the pitch control lever and the flange defines a series of openings therethrough, each of the series of openings positioned to be in selective alignment with the fixation opening as the exchangeable bushing is rotated; and
wherein the multi-blade rotor further comprises a fixation member extending through the fixation opening and one of the series of openings to locate the exchangeable bushing and set the predetermined distance of the bearing accommodation aperture.

19. The multi-blade rotor of claim 18 wherein the flange defines the bearing accommodation aperture therethrough.

20. The multi-blade rotor of claim 15 wherein the multi-blade rotor further comprises a supplemental bushing received by the bushing accommodation aperture and in contact with the pitch-control lever, the supplemental bushing defining an elongated aperture therethrough, the elongated aperture defining a serrated inner contour; and
wherein the exchangeable bushing is received by the supplemental bushing and defines a serrated outer contour, the serrated outer contour of the exchangeable bushing sized to mate with the serrated inner contour of the supplemental bushing to locate the bearing accommodation aperture and the pitch link rod and to set the predetermined distance.

* * * * *